United States Patent [19]

Montren

[11] 4,166,389
[45] Sep. 4, 1979

[54] ELECTRONIC THERMOMETER PROBE ASSEMBLY

[75] Inventor: William T. Montren, Bayshore, N.Y.

[73] Assignee: Arbrook, Inc., Arlington, Tex.

[21] Appl. No.: 902,345

[22] Filed: May 3, 1978

[51] Int. Cl.² .................. G01K 13/00; G01K 7/22
[52] U.S. Cl. .................. 73/343 R; 73/362 AR;
   206/306; 338/28
[58] Field of Search .......... 73/362 AR, 359, 343 R;
   338/28; 136/221, 230; 206/306

[56] References Cited

U.S. PATENT DOCUMENTS

| | | | |
|---|---|---|---|
| 3,500,280 | 3/1970 | Ensign | 73/362 AR |
| 3,663,917 | 5/1972 | Mahmoodi | 338/28 |
| 3,738,172 | 6/1973 | Sato | 73/362 AR |
| 3,822,593 | 7/1974 | Oudewaal | 338/28 |
| 3,832,669 | 8/1974 | Mueller | 338/28 |
| 3,929,018 | 12/1975 | Turner | 338/28 |
| 4,007,832 | 2/1977 | Paull | 73/362 AR |

*Primary Examiner*—S. Clement Swisher
*Attorney, Agent, or Firm*—Scully, Scott, Murphy & Presser

[57] ABSTRACT

An electronic thermometer probe assembly dseigned to provide an instrument which is highly accurate and convenient to use. The thermometer includes a probe section having a flexible plastic shaft with a thermistor mounted at its tip. A disposable probe sheath covers the thermistor and flexible shaft, and is replaced after each measurement to ensure that the instrument remains uncontaminated. The sheath is cylindrically shaped, and has an open end which extends onto a conically-shaped retainer for the sheath. The thermometer handle includes an axially displaceable section, movement of which dislodges the sheath from the retainer to enable it to be disposed of conveniently.

19 Claims, 6 Drawing Figures

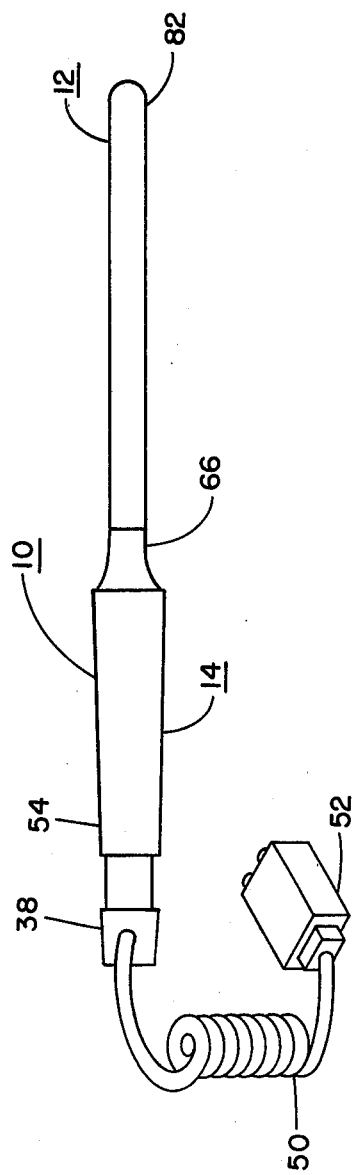
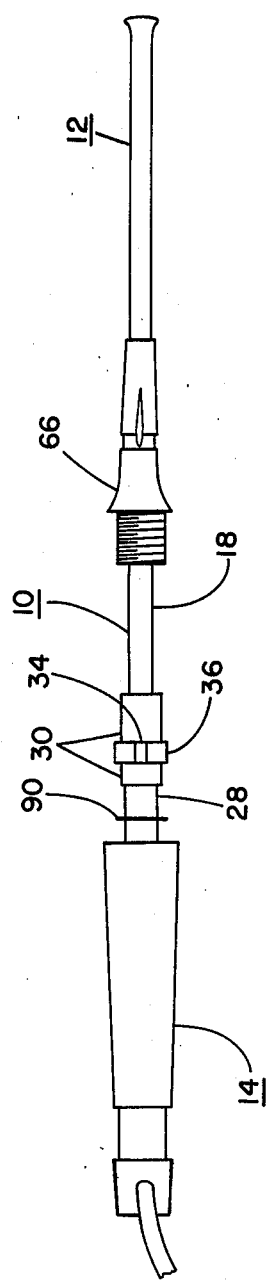
FIG. 1
FIG. 2

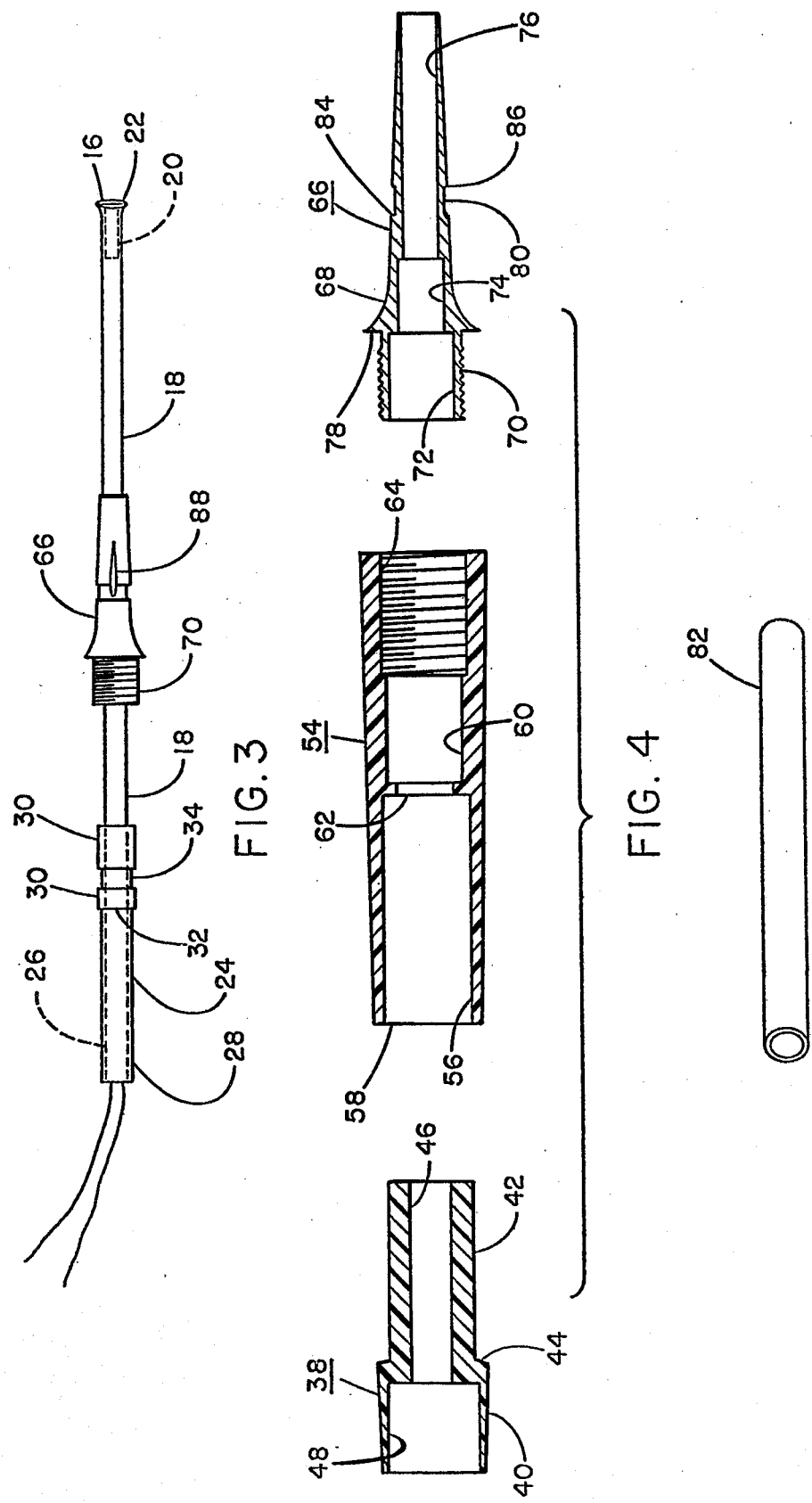

ELECTRONIC THERMOMETER PROBE ASSEMBLY

BACKGROUND OF THE INVENTION

1. Field of the Invention

The present invention relates, in general, to electronic thermometers and, more particularly, pertains to an assembly for an electronic thermometer which provides a highly accurate and conveniently employable instrument.

2. Discussion of the Prior Art

Electronic thermometers typically utilize a thermoelectric element, such as a thermistor, to sense a patient's temperature. An electronic signal processor is adapted to receive an electrical signal from the thermistor and to provide an accurate temperature measurement within a relatively short period of time. These thermometer units generally provide a digital display of the measured temperature through the intermediary of nixie tubes, light emitting diodes, liquid crystals, and the like. Electronic thermometers of this type are disclosed, for example, in U.S. Pat. No. 3,978,325 for Electronic Temperature Computer, and U.S. patent application Ser. No. 599,971 for Electronic Thermometer, filed July 29, 1975.

Electronic thermometers of this nature frequently constitute replacements for conventional glass-bulb mercury thermometers, particularly in applications wherein large numbers of temperature measurements are continually or frequently taken, particularly in facilities such as hospitals and clinics.

Since these thermometer units, in general, are intended for use with an extensive number of patients, the instrument must be designed so as to be easily sterilizable after each measurement. One approach to providing an uncontaminated temperature probe for each patient is to utilize a disposable sheath or cover for the thermometer probe and sensor. Thus, an electronic thermometer incorporating disposable probe sheaths should provide for their convenient and rapid mounting and subsequent replacement on the thermometer. Moreover, the instrument should allow used probe sheaths to be conveniently disposed of without necessitating any direct contact between the hands of the personnel using the instrument and the sheaths. Further, the thermometer probe sheath and probe should be of a design whereby each replacement sheath or cover will be accurately and precisely positioned on the instrument with the thermistor bead of the electronic instrument being in intimate physical contact with the interior of the sheath in order to afford an optimum degree of heat transfer from the patient to the thermistor bead.

Mead U.S. Pat. No. 3,678,751 for a Thermometer Cover discloses an electronic thermometer design typical of many in the prior art. The thermometer has a thermistor element for sensing a patient's temperature mounted at the end of a hollow cylindrical stainless steel shaft. A probe sheath is placed over the shaft, and is adapted to be disposed of after the taking of each measurement. The thermometer disclosed by this patent uses a rigid, as opposed to a flexible, shaft, and also the manner in which the probe sheaths are dislodged from the instrument is quite different from the approach taken by the present invention.

Mueller et al U.S. Pat. Nos. 3,729,998 and 3,832,699 disclose a rather complex instrument in which a temperature sensitive thermistor is mounted at the end of a rigid plastic shaft. A disposable probe sheath is placed over the shaft and extends onto several longitudinally oriented ribs formed on the instrument. An axially displaceable housing member facilitates removal of a used sheath. Although the disclosed design specifically provides for the removal of a used sheath, the instrument does not incorporate a flexible shaft to assist in this function. Further, the sheath retainer element is quite different in structure from that employed in the present invention.

Sato U.S. Pat. No. 3,738,172 for Temperature Sensing Probe and Disposable Probe Cover discloses an electronic thermometer having two relatively movable handle sections which are spring biased together. The two handle sections are separated slightly when a disposable probe sheath is placed over the shaft of the instrument. The probe sheath is held securely in place on the instrument by a split ring mounted around the instrument's shaft. A used sheath is disposed of by pressing together the two relatively movable handle sections, which dislodges the sheath from the split ring. This instrument differs from the present invention in several material aspects. Sato uses a nonflexible shaft, and the manner in which a disposable sheath is mounted thereon is quite different from that of the present invention. Also, the two relatively movable handle sections of this patent are spring biased together to provide a manner of usage of the instrument which is somewhat different from that of the present invention.

SUMMARY OF THE INVENTION

Accordingly, the present invention contemplates the provision of an improved and unique electronic thermometer probe assembly which is relatively simple in both construction and operation. Moreover, the design of the unit provides an instrument which is highly accurate, lightweight, durable and convenient in use.

In accordance with a preferred embodiment of the invention, there is disclosed an electronic thermometer assembly in which an electrical element for sensing temperature is mounted at one end of a flexible shaft, and wherein a probe handle having an axially displaceable portion extends from the other end of the shaft.

A conically shaped probe cover retainer is secured to the axially displaceable portion of the handle, and has an axially extending aperture through which there extends the shaft. With this arrangement, upon a probe cover or sheath being positioned over the shaft so as to extend onto the retainer, the flexible shaft and cover cause the shaft to be placed in slight compression, thereby ensuring good thermal contact between the end of the cover and the electrical element. The disposable cover is forcibly released from the instrument after a single usage by sliding the axially displaceable handle portion toward a stationary portion of the handle. This movement causes the flexible shaft to be placed into additional compression imparting a slight flexure to the shaft which causes the probe cover to be axially projected or expelled over a short distance after its forced release from the retainer. The axial projection of the cover allows it to be disposed of conveniently by merely inverting the instrument downwardly over a disposure receptacle. Further, the flexible shaft provides a very durable construction for the instrument, with the flexible shaft resisting breakage and also enabling it to be constructed of a lightweight material such as plastic.

In accordance with another aspect of the present invention, a probe stop member is attached to the flexible shaft in order to limit the axial displacement of the movable handle portion in a direction towards the sensing end of the instrument. Further, the stationary portion of the handle includes a cap which is attached to the probe stop member, the latter of which limits axial displacement of the movable handle away from the sensing end of the instrument. The movable portion of the handle has an axially extending cylindrical bore formed therein, while the stationary handle portion is provided with an extending cylindrical section axially movably positioned within the bore.

Pursuant to another aspect of the present invention, a spring washer is mounted to extend about the probe stop member, and frictionally engages the inside of the displaceable handle portion, which is tapered slightly, so as to impede axial movement of the latter. In accordance with still another aspect of the invention, the conically-shaped probe cover retainer is provided with a reduced diameter portion or groove about its circumference to thereby form an annular shoulder and a raised circular lip at the other end. The annular shoulder formed at one end of the reduced diameter portion limits the axial movement of a sheath or cover positioned on the retainer and ensures that it is correctly positioned on the instrument. The raised circular lip functions to secure the probe cover in its proper position on the thermometer. The probe cover retainer includes at least one axially extending notch or groove in its exterior surface which will allow air to be evacuated from the interior of a cover as the latter is being positioned on the instrument. In accordance with a further aspect of the present invention, silver epoxy cement completely covers the surface of the electrical element so as to secure it to the end of the flexible shaft while concurrently providing for an efficient transfer of heat to the element.

Accordingly, it is a primary object of the present invention to provide a novel electronic thermometer probe assembly which is relatively easy to construct, and the nature of which provides an instrument rendering it durable, lightweight, and convenient in use.

Another object of the present invention is to provide an electronic thermometer probe assembly of the type described having a unique probe cover or sheath retainer which facilitates accurate positioning of a disposable cover on the retainer, while allowing air to be expelled from interiorly of the cover as it is being positioned on the instrument.

BRIEF DESCRIPTION OF THE DRAWINGS

The foregoing and other objects and advantages of an inventive electronic thermometer assembly constructed pursuant to the teachings of the present invention may be more readily understood by one skilled in the art, having reference to the following detailed description of several preferred embodiments thereof, taken in conjunction with the accompanying drawings wherein identical reference numerals refer to similar elements throughout, and in which:

FIG. 1 is a longitudinal, partially perspective, view of an electronic thermometer probe assembly constructed pursuant to the present invention;

FIG. 2 is a longitudinal view of the electronic thermometer probe assembly of FIG. 1 shown partially disassembled so as to illustrate additional details of the internal construction thereof;

FIG. 3 illustrates a longitudinal view of the thermometer probe assembly with the probe handle removed to elucidate further features of its internal construction;

FIG. 4 is an exploded longitudinal sectional view of the components constituting the probe assembly handle and the probe cover retainer;

FIG. 5 illustrates a perspective view of one embodiment of a disposable probe cover which may be used with the thermometer probe assembly of the present invention.

DETAILED DESCRIPTION OF THE DRAWINGS

Figure 6:
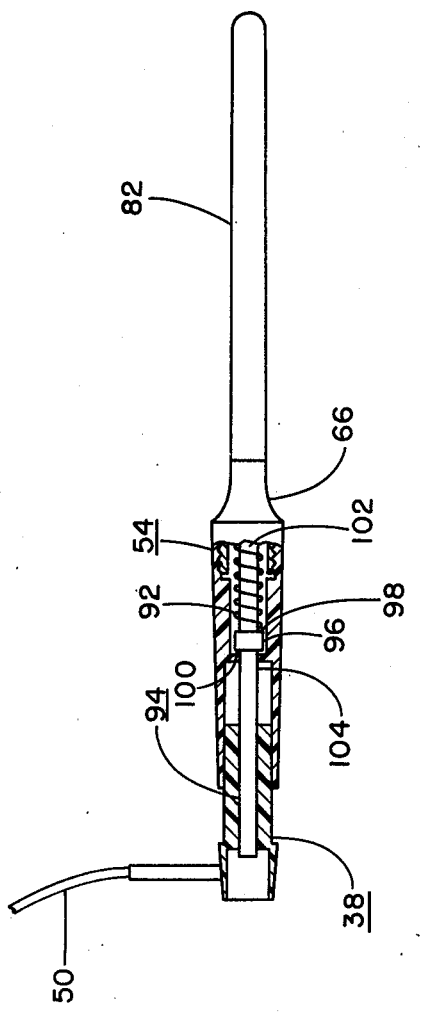
FIG. 6 is a partially sectional view of another embodiment of the present invention wherein a spring is utilized to bias apart the two relatively movable handle portions of the instrument.

Referring now in detail to the drawings, FIGS. 1 and 2 show longitudinal views of an electronic thermometer probe assembly 10 which includes a sensing end 12 and a handle end 14. The sensing end 12 is adapted to be inserted into an oral or rectal cavity of a patient while the handle end 14 of the instrument is being grasped by the person taking the temperature measurement. As illustrated in FIG. 3, a thermistor 16 is mounted at the sensing end 12 of the instrument within a flexible hollow shaft 18 which extends the length of the assembly. In one particular embodiment of the invention, the hollow shaft is formed of a white Delrin or Celcon nylon, and its external diameter is approximately 0.1 inch. An elongated block of foamed styrene synthetic resin 20 is securely positioned within the hollow shaft 18 proximate the sensing end of the instrument, and serves to mount the thermistor 16 therein. Two electrical wires connected to the thermistor extend through the block 20 and shaft 18, and lead back to the handle end of the instrument. A foamed styrene synthetic resin material is utilized in the construction of the block 20 since it provides an efficient insulator for the thermistor and does not absorb an appreciable quantity of heat. These qualities are desirable to impart the least adverse effects on the thermal time constant of the thermistor. A layer of silver epoxy glue 22 is provided to surround the thermistor and secure the latter in place at the end of the foamed styrene block 20. Silver epoxy glue is commercially available, and is utilized because of its high thermal conductivity which results in imparting an efficient degree of heat transfer to the thermistor. The electrical leads to the thermistor may be coated with plastic in the region of the silver epoxy cement to prevent being shorted thereby. The inside of the shaft 18 is preferably threaded at the sensing end to assist in adhering the silver epoxy glue securely in place therein. The sensing end of shaft 18 may be conically shaped to provide a large surface area pressed against the end of a disposable sheath, or it may have a plain cylindrical shape. The thermistor 22 may be a larger, glass coated thermistor bead because of the unique combination of features at the sensing end of shaft 18. The foamed styrene plug 20 and the plastic shaft 18 have a minimal effect on the thermal response time of the thermistor while the silver epoxy glue provides excellent heat conduction to it.

A probe stop member 24 is glued to the handle end of shaft 18 as best illustrated in FIG. 3. Probe stop member 24 has an axially extending bore 26 formed along the length thereof, into which there is fitted and glued shaft 18. The exterior of the probe stop member 24 is generally cylindrical, and comprises a first smaller diameter annular section 28 and a second larger diameter annular section 30, with an annular shoulder 32 being formed at the juncture of the two sections 28, 30. A further smaller diameter annular portion 34 is formed along the axial length of the larger diameter annular section 30 to thereby divide the latter into two separate portions, and serves to secure in place a split washer 36 positioned to extend about the stop member 24, as illustrated in FIG. 2.

A stationary handle portion 38 is glued onto the handle end of the probe stop member 24, and includes first and second axially extending, substantially cylindrical sections 40 and 42 of differing external diameters so that an annular shoulder 44 is formed at their juncture. A first axially extending cylindrical bore 46 is formed to extend through the entire length of the smaller diameter cylindrical section 42 and partly into the larger diameter cylindrical section 40. The cylindrical portion 28 of the stop member 24 extends through aperture 46 and is fastened therein by means of a suitable adhesive. A larger, axially extending cylindrical cavity 48 is formed in the larger diameter cylindrical section 40 so as to communicate with bore 46, with the leads from the thermistor extending through flexible shaft 18 into the cavity 48 where they are electrically joined to the wires of a coiled insulated cord 50. After assembly of the unit, a plastic filler may be injected into cavity 48 to form a suitably finished and electrically insulated product. Coiled cord 50 enters the probe through a radial aperture extending through the side wall of cylindrical section 40. An electrical plug 52 may be coupled to the distal end of coiled cord 50, and is adapted to electrically connect the output of the thermistor 16 to an operatively associated electronic unit, such as a display or recording unit providing indicia of sensed measurement.

An axially displaceable handle portion 54 is provided with a first bore 56 axially extending through approximately one-half of its length and, after assembly of the unit, the cylindrical section 42 of the stationary housing member is positioned within bore 56. The arrangement is such that the movable handle portion 54 may slide axially relative to the stationary handle portion 38, with cylindrical bore 56 being slidably supported on the peripheral outer surface of cylindrical section 42. Axial displacement of handle portion 54 in a direction away from the sensing end 12 of the instrument is limited by its end surface 58 contacting annular shoulder 44 of the stationary handle portion 38. A smaller diameter axially extending tapered bore 60 is formed in the other end of slidable housing portion 54, and extends along approximately one-half the length of the handle portion 54 into proximity with the bore 56. Bore 60 is tapered approximately 1° with respect to the longitudinal axis of the handle portion 54, with its larger diameter being at the sensing end of the instrument. The taper is provided to apply a radial force against split washer 36 as the housing portion 54 is axially moved toward the sensing end of the instrument and further to make removal of portion 54 easier as it is being released from the mold in which it is formed. A small diameter axially extending hole 62 interconnects the bores 56 and 60, and forms an annular shoulder therebetween. The annular shoulder is adapted to cooperatively engage with annular shoulder 32 on the probe stop member so as to limit axial displacement of movable handle member 54 towards the sensing end of the instrument. Internal threads 64 are formed at the external end of bore 60, and extend along about one-half the length thereof. As illustrated in FIG. 2, the two handle portions 38 and 54 may have the shapes of their exterior peripheral surfaces tapered slightly inwardly away from the sensing end 12 of the instrument. The handle portions 38, 54 may be molded from any suitable commercially available plastic and, further, may be color coded to indicate whether the particular instrument is to be used for oral or rectal measurements.

A cover or sheath retainer element 66, having a generally conical, and partly concavely curved external peripheral surface 68, is provided towards the instrument sensing end of the handle. External threads 70 are formed at one end of the retainer element, and are adapted to threadingly engage the internal threads 64 of axially displaceable handle portion 54. A large diameter, axially extending, cylindrical bore 72 is formed through the end of the retainer element containing the threads 70, with the cylindrical portion 30 of the probe stop being slidable within bore 72 during relative axial movement of the two components. An intermediate diametrically sized, axially extending, cylindrical bore 74 extends from bore 72 to a smaller diameter, axially extending, cylindrical bore 76 forming an annular shoulder at the juncture of bores 74 and 76. Bore 76 is slightly larger in diameter than the external diameter of flexible shaft 18 which allows the shaft to be slidably positioned therein after assembly of the unit. The external surface of the retainer element 66 is generally frustoconical in cross section, with the base portion flaring outwardly at 78 to approximately the same diametrical dimension as that of the end of movable handle element 54 to which it is attached. A smaller diameter cylindrical surface or annular recess 80 is formed along a portion of the length of retainer element 66, at a precise axial location determined by the length of a disposable cover or sheath 82, as shown in FIG. 5, and by the dimensions of the instrument. The formation of cylindrical surface or recess 80 in the concavely curved tapered surface 68 results in the formation of an annular shoulder 84 at one end of the cylindrical surface 80 and a circular lip 86 at the other end of the surface. The annular shoulder 84 serves to precisely axially position a disposable sheath 82 placed over the flexible shaft 18 and moved into abutment with the shoulder 84. The circular lip 86 has an external diameter slightly larger than the internal diameter of sheath 82 so as to securely grip the sheath in its proper position. The disposable sheath 82 is formed of flexible plastic so as to be readily resiliently deformable to allow their movement over the lip 86. Two axially extending shallow notches 88 are formed on opposite sides of the outer surface of retainer element 66, and extend across lip 86. These notches function to allow air to be evacuated or expelled from the interior of a sheath 82 as the latter is being slid onto the retainer element 66. Without the presence of these notches, air might be compressed within a sheath as it is being positioned on the instrument, which possibly could result in the sheath being subsequently forced off the retainer element by the compressed air or into improper positioning thereon. In variations of the disclosed design, either a larger or lesser number of notches may be formed in the surface of the retainer element. In one embodiment, the retainer element is constructed of aluminum, however, it is apparent that it may be formed of other suitable materials.

A sheath 82 is properly positioned on the electronic thermometer assembly by means of the following procedure:

After removal of a used sheath, the movable handle portion 54 is located in a position where it abuts against the stationary handle portion 38. With the assembly in this position, the movable handle portion is then grasped, and the flexible shaft 18 is inserted into a new sheath 82 in a manner whereby the thermistor 16 is located towards the interior of the closed end of the sheath. Further pushing against the handle 54 moves the open end of the sheath over circular lip 86 so as to bear against annular shoulder 84. The flexible shaft 18 is now in compression because of the resilient natures of the sheath and the shaft, to thusly force the thermistor end of the shaft into intimate contact with the closed end of the sheath and to ensure good conduction of heat through the sheath 82 to the thermistor 16. After the temperature of the patient has been taken, the used sheath is detached from the instrument by pushing the movable handle portion and cap portion of the handle together, which places the flexible shaft into greater compression and causes it to slightly flex. Further pushing together of the handle portions causes the bent shaft to "pop" the sheath off the retainer member with a slight axial projection or ejecting action which allows the sheath to be disposed of conveniently by inverting the instrument downwardly over a disposal receptacle.

If desired, a thin plate or spring washer 90 may be arranged or cylindrical portion 28 so as to be axially slidable thereon. The washer 90 is positioned between shoulder 32 and the annular shoulder formed at hole 62 to prevent axial binding between the parts when the two housing portions are axially moved apart.

FIG. 6 is a partially sectional view of a second embodiment of the present invention wherein a spring 92 is utilized to bias apart the two relatively movable handle portions 38 and 54. In this embodiment a modified probe stop member 94 has a large cylindrical portion 96 which forms forward and rearward annular shoulders 98 and 100 at its juncture with smaller forward and rearward cylindrical portions 102 and 104. Spring 92 is mounted about smaller cylindrical portion 102, and is held in compression between the forward annular shoulder 98 on the probe stop member 94 and the annular shoulder formed internally in sheath retainer element 66 between the different diameter bores 74 and 76. Spring 92 biases the sheath retainer element 66 and attached movable housing portion 94 forward toward the sensing end of the instrument. Movement in this direction is limited by contact of the annular shoulder formed at the juncture of different diameter bores 60 and 62 with the rearward annular shoulder 100 of the probe stop member 94. In yet another embodiment of the present invention which is not described in detail herein, the two portions of the handle might be spring biased together, rather than apart.

While several embodiments of the present invention for an electronic thermometer assembly have been described in detail, the teachings herein regarding applicant's contribution to the art will suggest many alternative embodiments to those skilled therein.

What is claimed is:

1. An electronic thermometer probe assembly, comprising:
   (a) an electrical element for sensing temperature and varying an electrical characteristic in response thereto;
   (b) a resilient flexible shaft formed of plastic such that it is of a durable and lightweight construction, said electrical element being mounted at one end of said shaft;
   (c) a probe handle connected to the other end of said flexible shaft and extending coaxially therefrom, said handle having an axially displaceable portion;
   (d) a probe cover retainer secured to said axially displaceable portion of said probe handle and having an axial bore therethrough, said flexible shaft extending through said bore, whereby a generally cylindrical probe cover may be positioned over said flexible shaft and into engagement with said cover retainer with the probe cover being releasable subsequent to usage thereof by sliding said axially displaceable handle portion in a direction away from the probe cover so as to cause said flexible shaft to be placed slightly in compression and said cover to be axially projected a slight distance upon release thereof from said retainer to facilitate disposal of said cover.

2. An electronic thermometer probe assembly as claimed in claim 1, comprising a probe stop member attached to said other end of said flexible shaft for limiting the axial displacement of said displaceable handle portion in the direction towards said electrical element, said probe handle including a cap portion secured to said probe stop member for limiting the axial displacement of said displaceable handle portion in a direction away from said electrical element.

3. An electronic thermometer probe assembly as claimed in claim 2, said handle cap portion including a cylindrical section, and said axially displaceable handle portion including an axially extending cylindrical bore therein adapted to receive said cylindrical section of said cap portion.

4. An electronic thermometer probe assembly as claimed in claim 3, comprising a spring washer mounted on said probe stop member and frictionally engaging the interior of said displaceable handle portion to impede axial movement thereof.

5. An electronic thermometer probe assembly as claimed in claim 4, the interior surface of said displaceable handle portion being tapered axially along its length where it is engaged by said spring washer, with the wider portion of the taper being toward the probe cover retainer.

6. An electronic thermometer probe assembly as claimed in claim 5, said probe cover retainer having a substantially conically shaped exterior surface with a reduced diameter portion extending thereabout forming an annular shoulder at one end thereof for limiting axial movement of said probe cover upon being positioned on the retainer and a raised circular lip at the other end of the reduced diameter portion for securing said probe cover in position after positioning on said retainer.

7. An electronic thermometer assembly as claimed in claim 6, said probe cover retainer including at least one axial slot formed in the exterior surface thereof facilitating air to be expelled from said cover as the latter is positioned on said retainer.

8. An electronic thermometer assembly as claimed in claim 7, including silver epoxy cement securing said electrical element to said one end of said flexible shaft and providing efficient heat conduction to said thermoelectric element.

9. An electronic thermometer assembly as claimed in claim 8, the temperature sensing portion of said electrical element being completely covered by said silver epoxy cement.

10. An electronic thermometer assembly as claimed in claim 1, said probe cover retainer having a substantially conically shaped exterior surface with a reduced diameter portion extending thereabout forming an annular shoulder at one end thereof for limiting axial movement of said probe cover upon being positioned on the retainer and a raised circular lip at the other end of the reduced diameter portion for securing said probe cover in position after positioning on said retainer.

11. An electronic thermometer assembly as claimed in claim 10, said probe cover retainer including at least one axial slot formed in the exterior surface thereof facilitating air to be expelled from said cover as the latter is positioned on said retainer.

12. An electronic thermometer assembly as claimed in claim 1, including silver epoxy cement securing said electrical element to said one end of said flexible shaft and providing efficient heat conduction to said electrical element.

13. An electronic thermometer assembly as claimed in claim 12, the temperature sensing portion of said electrical element being completely covered by said silver epoxy cement.

14. An electronic thermometer assembly as claimed in claim 1, said flexible shaft being formed of plastic, whereby it is of a durable and lightweight construction.

15. An electric thermometer probe assembly and probe cover, comprising:
(a) an electrical element for sensing temperature and varying an electrical characteristic in response thereto;
(b) a resilient flexible shaft formed of plastic such that it is of a durable and lightweight construction, said electrical element mounted at one end of said shaft;
(c) a probe handle connected to the other end of said flexible shaft and extending coaxially therefrom, said handle having an axially displaceable portion;
(d) a probe cover retainer secured to said axially displaceable portion of said probe handle and having an axial bore therethrough with said flexible shaft extending through said bore; and
(e) a generally cylindrical probe cover positionable over said flexible shaft and into engagement with said cover retainer, said flexible shaft and cover being in compressive relationship for ensuring good thermal contact between the end of said cover and said electrical element, said probe cover being releasable subsequent to usage thereof by sliding said axially displaceable handle portion in a direction away from the probe cover so as to cause said flexible shaft to slightly compressively bend and said cover to be axially projected a slight distance upon release thereof from said retainer to facilitate disposal of said cover.

16. An electronic thermometer probe assembly and probe cover as claimed in claim 15 wherein said probe cover has a substantially uniform thickness along its entire length.

17. An electronic thermometer probe assembly and probe cover as claimed in claim 1, comprising a probe stop member attached to said other end of said flexible shaft for limiting the axial displacement of said displaceable handle portion in the direction towards said electrical element, said probe handle including a cap portion secured to said probe stop member for limiting the axial displacement of said displaceable handle portion in a direction away from said electrical element.

18. An electronic thermometer probe assembly and probe cover as claimed in claim 15, said probe cover retainer having a substantially conically-shaped exterior surface with a reduced diameter portion extending thereabout forming an annular shoulder at one end thereof for limiting axial movement of said probe cover upon being positioned on the retainer and a raised circular lip at the other end of the reduced diameter portion for securing said probe cover in position after positioning on said retainer.

19. An electronic thermometer probe assembly and probe cover as claimed in claim 15, said probe cover retainer including at least one axial slot formed in the exterior surface thereof facilitating air to be expelled from said cover as the latter is positioned on said retainer.

* * * * *